US 6,581,586 B2

(12) United States Patent  
Sekiya

(10) Patent No.: US 6,581,586 B2
(45) Date of Patent: Jun. 24, 2003

(54) CUTTING MACHINE

(75) Inventor: Kazuma Sekiya, Tokyo (JP)

(73) Assignee: Disco Corporation, Tokyo (JP)

( * ) Notice: Subject to any disclaimer, the term of this patent is extended or adjusted under 35 U.S.C. 154(b) by 59 days.

(21) Appl. No.: 09/854,496

(22) Filed: May 15, 2001

(65) Prior Publication Data
US 2001/0044256 A1 Nov. 22, 2001

(30) Foreign Application Priority Data
May 22, 2000 (JP) ....................................... 2000-149943

(51) Int. Cl.⁷ ................................................. B28D 1/04
(52) U.S. Cl. ............................... 125/13.01; 125/13.02; 125/14; 125/20
(58) Field of Search .......................... 125/13.01, 13.02, 125/14, 20

(56) References Cited

U.S. PATENT DOCUMENTS 5,485,771 A * 1/1996 Brennan et al. ............. 82/1.11
6,344,402 B1 * 2/2002 Sekiya ....................... 438/460

* cited by examiner

Primary Examiner—Joseph J. Hail, III
Assistant Examiner—Shantese McDonald
(74) Attorney, Agent, or Firm—Smith, Gambrell & Russell, LLP

(57) ABSTRACT

A cutting machine comprising a chuck means for holding a workpiece to be cut and a cutting means for cutting the workpiece held on the chuck means. The cutting machine further has a first moving means for moving the chuck means relative to the cutting means in the first direction, a second moving means for moving the cutting means relative to the chuck means in the second direction perpendicular to the first direction, and a third moving means for moving the cutting means relative to the chuck means in the third direction perpendicular to the first direction and the second direction. The cutting means comprises a rotary blade which can turn on the center axis of rotation extending in the second direction and is shaped like an annular thin plate perpendicular to the second direction. The cutting depth of the workpiece is defined by the position of the circular periphery of the rotary blade in the third direction and cutting is carried out by moving the chuck means relative to the cutting means in the first direction. The cutting machine further comprises a rotary blade detection means capable of detecting the position of the rotary blade in the second direction and the position of the circular periphery of the rotary blade in the third direction.

6 Claims, 5 Drawing Sheets

CUTTING MACHINE

FIELD OF THE INVENTION

The present invention relates to a cutting machine having a cutting means that comprises a rotary blade, for cutting a workpiece such as a semiconductor wafer.

DESCRIPTION OF THE PRIOR ART

As known to people of ordinary skill in the art, in the production of semiconductor chips, a plurality of rectangular regions are sectioned by streets arranged on the surface of a semiconductor wafer in a lattice form, and a semiconductor circuit is formed in each of the rectangular regions. The rectangular regions are separated from one another by cutting the semiconductor wafer along the streets to produce semiconductor chips. To cut the semiconductor wafer along the streets, a cutting machine that is also called "dicer" is used. The cutting machine has a chuck means for holding a workpiece to be cut, that is, a semiconductor wafer and a cutting means for cutting the semiconductor wafer. The cutting machine further comprises a first moving means for moving the chuck means relative to the cutting means in the first direction, a second moving means for moving the cutting means relative to the chuck means in the second direction perpendicular to the first direction, and a third moving means for moving the cutting means relative to the chuck means in the third direction perpendicular to the first direction and the second direction. The cutting means comprises a rotary blade which is mounted rotatably on the center axis of rotation extending in the second direction. This rotary blade has a shape of an annular thin plate and is disposed perpendicular to the second direction. By moving the chuck means relative to the cutting means in the first direction, the circular peripheral portion of the rotary blade is applied to the semiconductor wafer to gradually cut the semiconductor wafer in the first direction. The cutting line of the semiconductor wafer is defined by the position of the rotary blade in the second direction. The cutting depth of the semiconductor wafer is defined by the position of the circular periphery of the rotary blade in the third direction.

It is important that the cutting of the semiconductor wafer should be carried out along the streets with strict accuracy. It is important that the cutting depth should be also set to a required value sufficiently precisely. It is therefore important that the position of the rotary blade in the second direction should be set fully accurately and that the position of the circular periphery of the rotary blade in the third direction should be set fully accurately. Accordingly, in a conventional cutting machine, when a rotary blade is newly set, a dummy wafer held on the chuck means is actually cut upon using the above new rotary blade to observe the cutting line of the dummy wafer, thereby detecting the accurate position of the rotary blade in the second direction. For the observation of the cutting line of the dummy wafer, there can be used a so-called alignment means that is used for detecting the position of each street of the semiconductor wafer held on the chuck means. The alignment means comprises a microscope arranged opposite to the surface of the semiconductor wafer, an imaging means for imaging an optical image input into the microscope and an image processing means for making required processing such as binary processing on an image obtained by the imaging means. Meanwhile, as for the position of the circular periphery of the rotary blade in the third direction, the rotary blade is moved in the third direction to bring the circular periphery thereof into contact with the surface of the chuck means to define the reference position thereof.

The making and setting of the rotary blade are inevitably accompanied by an error even though it is a slight degree. It is necessary therefore to carry out the above-described relatively troublesome operation for the accurate positioning of the rotary blade each time the rotary blade is exchanged. Further, when cutting is carried out repeatedly, the rotary blade is inevitably worn down and hence, the above-described relatively troublesome operation must be also carried out after cutting has been performed a required number of times.

Further, in the conventional cutting machine, the degree of abrasion of the rotary blade is checked with the naked eye and the rotary blade is exchanged when considerable abrasion is observed. The above observation with the eye is troublesome and requires skill.

SUMMARY OF THE INVENTION

It is therefore the principal object of the present invention to provide a novel and improved cutting machine which can set the position of the rotary blade in the second direction, that is, the cutting line of the rotary blade fully accurately without requiring troublesome operation such as the cutting of a dummy wafer.

It is another object of the present invention to enable to set the position of the circular periphery of the rotary blade in the third direction, that is, the cutting depth of the rotary blade fully accurately without requiring troublesome operation, in addition to the above principal object.

It is a further object of the present invention to enable to detect the abrasion of the rotary blade automatically, in addition to the above principal object and the another object.

According to the present invention, the above principal object is attained by providing a rotary blade detection means capable of detecting the position of the rotary blade in the second direction. The above another object and further object of the present invention are attained by enabling the rotary blade detection means to detect the position of the circular periphery of the rotary blade in the third direction as well.

That is, according to the present invention, the cutting machine for attaining the above principal object of the present invention comprises a chuck means for holding a workpiece to be cut, a cutting means for cutting the workpiece held on the chuck means, a first moving means for moving the chuck means relative to the cutting means in the first direction, and a second moving means for moving the cutting means relative to the chuck means in the second direction perpendicular to the first direction, the cutting means being constituted by a rotary blade mounted so as to rotate on the center axis of rotation extending in the second direction, wherein the cutting machine further is provided with a rotary blade detection means capable of detecting the position of the rotary blade in the second direction.

The cutting machine for attaining the above another object and further object comprises a third moving means for moving the cutting means relative to the chuck means in the third direction perpendicular to the first direction and the second direction, the rotary blade is shaped like an annular thin plate perpendicular to the second direction, the cutting depth of the workpiece is defined by the position of the circular periphery of the rotary blade in the third direction, cutting is carried out by moving the chuck means relative to the cutting means in the first direction, and the rotary blade detection means can also detect the position of the circular periphery of the rotary blade in the third direction.

Preferably, the rotary blade detection means is constituted by a first microscope having an optical axis perpendicular to the second direction, a second microscope having an optical axis perpendicular to the third direction, an imaging means for imaging an optical image input into the first microscope and an optical image input into the second microscope selectively, and an image processing means for processing an image obtained by the imaging means. Preferably, the optical axis of the second microscope is parallel to the second direction. The workpiece may be a semiconductor wafer which has a plurality of rectangular regions sectioned by streets formed on the surface in a lattice form and semiconductor circuits formed in the respective rectangular regions, and which is cut along the streets.

DETAILED DESCRIPTION OF THE PREFERRED EMBODIMENTS

Preferred embodiments of a cutting machine constituted according to the present invention will be described in detail with reference to the accompanying drawings hereinafter.

Figure 1:
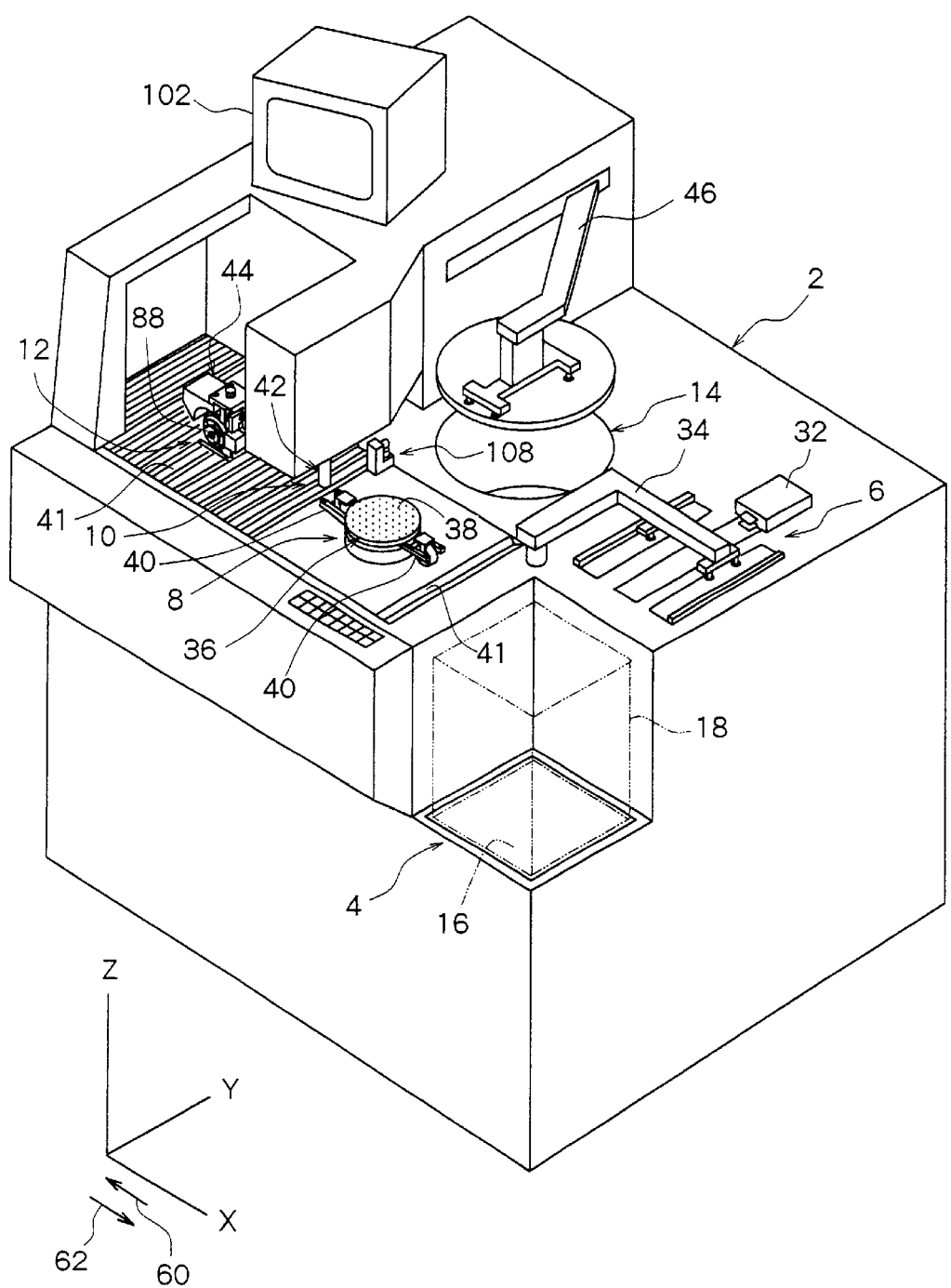
FIG. 1 is a schematic perspective view showing a preferred embodiment of an entire cutting machine constituted according to the present invention.

FIG. 1 shows a preferred embodiment of the cutting machine constituted according to the present invention. The illustrated cutting machine has a housing 2, and on the housing 2, there are defined a loading area 4, a waiting area 6, a chucking area 8, an alignment area 10, a cutting area 12 and a cleaning/drying area 14. A lifting table 16 is provided in the loading area 4, and a cassette 18 is loaded on this lifting table 16. A plurality of semiconductor wafers 20 (FIG. 2) are stored, spaced from each other, in an up-and-down direction in this cassette 18.

Figure 2:
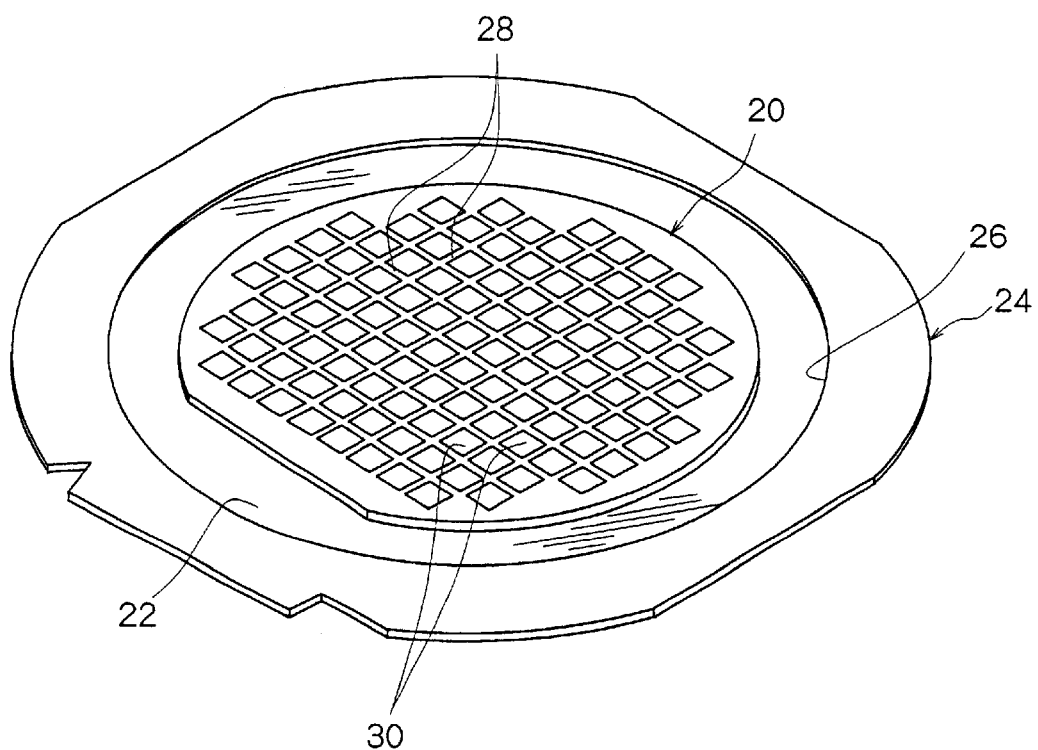
FIG. 2 is a perspective view of a semiconductor wafer mounted on a frame through an attachment tape, which is supplied as a workpiece to the cutting machine of FIG. 1.

As clearly shown in FIG. 2, each of the semiconductor wafers 20 stored in the cassette 18 is mounted on a frame 24 through an attachment tape 22. The frame 24 that can be formed of a metal or synthetic resin has a relatively large circular opening 26 at the central portion thereof, and the attachment tape 22 extending across the circular opening 26 is stuck onto the back face of the frame 24. The semiconductor wafer 20 is positioned inside the circular opening 26 and the back face thereof is stuck to the attachment tape 22. Streets 28 are arranged on the surface of the semiconductor wafer 20 in a lattice form to thereby define a plurality of rectangular regions 30. A semiconductor circuit is formed in each of the rectangular regions 30.

Continuing a description with reference to FIG. 1, a first conveying means 32 is provided in relation to the loading area 4 and the waiting area 6. The first conveying means 32 is actuated in response to the up-and-down movement of the lifting table 16 to carry-out the frames 24 mounting the semiconductor wafers 20 to be cut from the cassette 18 to the waiting area 6 sequentially (and as will be described later, to carry-in the frame 24 mounting the semiconductor wafer 20 that has been cut, cleaned and dried from the waiting area 6 to the cassette 18). A second carrying means 34 is provided in relation to the waiting area 6, the chucking area 8 and the cleaning/drying area 14. The frame 24 delivered from the cassette 18 to the waiting area 6 is conveyed to the chucking area 8 by the second conveying means 34. In the chucking area 8, the frame 24 and the semiconductor wafer 20 mounted thereon are held by a chuck means 36. Stated more specifically, the chuck means 36 has a chuck plate 38 having a substantially horizontal adsorption surface, and a plurality of suction holes or grooves are formed in the chuck plate 38. The semiconductor wafer 20 mounted on the frame 24 is placed on the chuck plate 38 and vacuum-adsorbed to the chuck plate 38. The chuck means 36 further has a pair of holding means 40 so that the frame 24 is held by the pair of holding means 40.

As will be described later, the chuck means 36 is caused to move in the first direction which is substantially horizontal, that is, in the X-axis direction, and the semiconductor wafer 20 held by the chuck means 36 is moved with the movement of the chuck means 36, and conveyed to the alignment area 10 and the cutting area 12 in sequence. In the illustrated embodiment, a bellows means 41 which is expanded or contracted with the movement of the chuck means 36 is provided on both sides (that is, downstream side and upstream side) of the chuck means 36 when seen from the X-axis direction. An alignment means 42 is provided in relation to the alignment area 10. In the alignment area 10, an image of the surface of the semiconductor wafer 20 held on the chuck means 36 is imaged and the semiconductor wafer 20 is adjusted to locate at a desired position fully accurately based on the image. Thereafter, in the cutting area 12, the semiconductor wafer 20 is cut along the streets 28 by action of a cutting means 44. Though the rectangular regions 30 are separated from one another by this cutting, the attachment tape 22 is not cut and the individually separated rectangular regions 30 continue to be mounted on the frame 24 via the attachment tape 22. The alignment means 42 and the cutting means 44 will be described in more detail hereinafter.

After the semiconductor wafer 20 has been cut as desired in the cutting area 12, the chuck means 36 is returned to the chucking area 8. A third conveying means 46 is provided in relation to the chucking area 8 and the cleaning/drying area 14, and the frame 24 and the semiconductor wafer 20 mounted thereon are carried to the cleaning/drying area 14 by the third conveying means 46. In the cleaning/drying area 14, the cut semiconductor wafer 20 is cleaned and dried by a cleaning/drying means (not shown). Thereafter, the frame 24 and the semiconductor wafer 20 mounted thereon are returned to the waiting area 6 by the second conveying means 34 and then, to the cassette 18 by the first conveying means 32.

Figure 3:
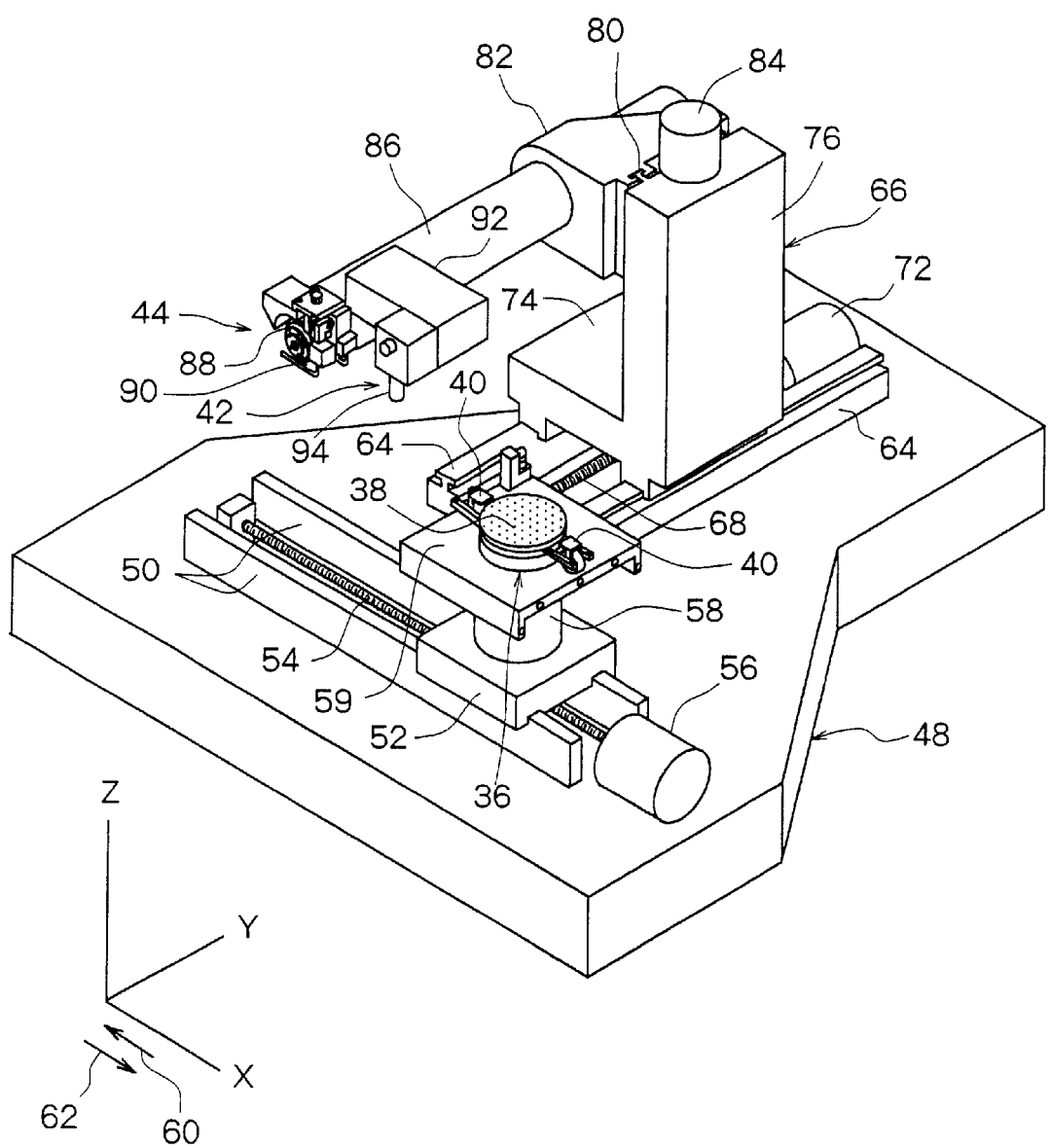
FIG. 3 is a perspective view of essential constituent elements of the cutting machine of FIG. 1.

In FIG. 3, the bellows means 41 arranged on the top wall of the housing 2 and both sides of the chuck means 36 are omitted and constituent elements arranged below these are illustrated. Describing with reference to FIG. 1 and FIG. 3, a support base 48 is provided in the housing 2. On this support base 48 are fixed a pair of guide rails 50 extending in an X-axis direction and a sliding block 52 is mounted on the pair of guide rails 50 in such a manner that it can move in the X-axis direction. A threaded shaft 54 extending in the X-axis direction is rotatably mounted between the pair of guide rails 50 and is coupled to the output shaft of a pulse motor 56. The sliding block 52 has a pendent portion (not shown), an internally threaded hole penetrating through the pendent portion in the X-axis direction is formed in the pendent portion, and the threaded shaft 54 is screwed into the internally threaded hole. A support table 59 is fixed on the sliding block 52 via a cylindrical member 58, and further the chuck means 36 is mounted on the support table 59. Therefore, when the pulse motor 56 is turned forward, the support table 59 and the chuck means 36 are moved in a cutting direction indicated by an arrow 60, while when the pulse motor 56 is turned reverse, the support table 59 and the chuck means 36 are moved in a return direction indicated by an arrow 62. Accordingly, the pulse motor 56 constitutes a first moving means for moving the chuck means 36 in the first direction which is the X-axis direction. The chuck plate 38 and the pair of holding means 40 constituting the chuck means 36 are mounted such that they can turn on the center axis extending in a substantially vertical direction, and a pulse motor (not shown) for turning the chuck plate 38 and the pair of holding means 40 is provided in the cylindrical member 58.

A pair of guide rails 64 extending in the second direction perpendicular to the first direction, that is, in a Y-axis direction are also secured on the support base 48, and a sliding block 66 is mounted on the pair of guide rails 64 in such a manner that it can move in the Y-axis direction. A threaded shaft 68 extending in the Y-axis direction is rotatably mounted between the pair of guide rails 64 and is coupled to the output shaft of a pulse motor 72. The sliding block 66 is substantially shaped like letter L and has a horizontal base portion 74 and an upright portion 76 extending upward from the horizontal base portion 74. A pendent portion (not shown) that hangs down is formed on the horizontal base portion 74, an internally threaded hole penetrating through the pendent portion in the Y-axis direction is formed in the pendent portion, and the threaded shaft 68 is screwed into the internally threaded hole. A pair of guide rails 80 (FIG. 3 shows only an upper end of one of the guide rails 80) extending in the third direction perpendicular to the first direction and the second direction, that is, in a Z-axis direction are formed on the upright portion 76 of the sliding block 66. A coupling block 82 is mounted on the pair of guide rails 80 in such a manner that it can move in the Z-axis direction. A threaded shaft (not shown) extending in the Z-axis direction is rotatably mounted on the upright portion 76 of the sliding block 66 and is coupled to the output shaft of a pulse motor 84. A projecting portion (not shown) projecting toward the upright portion 76 of the sliding block 66 is formed on the coupling block 82, an internally threaded hole penetrating through the projecting portion in the Z-axis direction is formed in the projecting portion, and the above threaded shaft extending in the Z-axis direction is screwed into the internally threaded hole. The above-described cutting means 44 is attached to the coupling block 82. The cutting means 44 has a casing 86 secured to the coupling block 82 and a rotary shaft (not shown) extending in the second direction that is the Y-axis direction is rotatably mounted in the casing 86. A rotary blade 88 is detachably mounted to this rotary shaft by a suitable mounting unit. In the casing 86, a motor (not shown) is dispose to rotate the rotary shaft at a high speed. The rotary blade 88 is advantageously an annular thin plate formed by dispersing diamond particles in an electrodeposited metal. A cooling water ejection means 90 for ejecting a cooling liquid which may be pure water is also disposed at an end of the casing 86.

When the pulse motor 72 is turned forward, the sliding block 66 is index-moved forward in the Y-axis direction, whereby the rotary blade 88 is index-moved forward in the Y-axis direction. When the pulse motor 72 is turned reverse, the sliding block 66 is index-moved backward in the Y-axis direction, whereby the rotary blade 88 is index-moved backward in the Y-axis direction. Therefore, the pulse motor 72 constitutes the second moving means for moving the rotary blade 88 in the second direction, that is, in the Y-axis direction. When the pulse motor 84 is turned forward, the coupling block 82 is lowered in the Z-axis direction, whereby the rotary blade 88 is lowered in the Z-axis direction. When the pulse motor 84 is turned reverse, the coupling block 82 is lifted up in the Z-axis direction, whereby the rotary blade is lifted up in the Z-axis direction. Therefore, the pulse motor 84 constitutes the third moving means for moving the rotary blade 88 in the third direction, that is, in the Z-axis direction.

Figure 5:
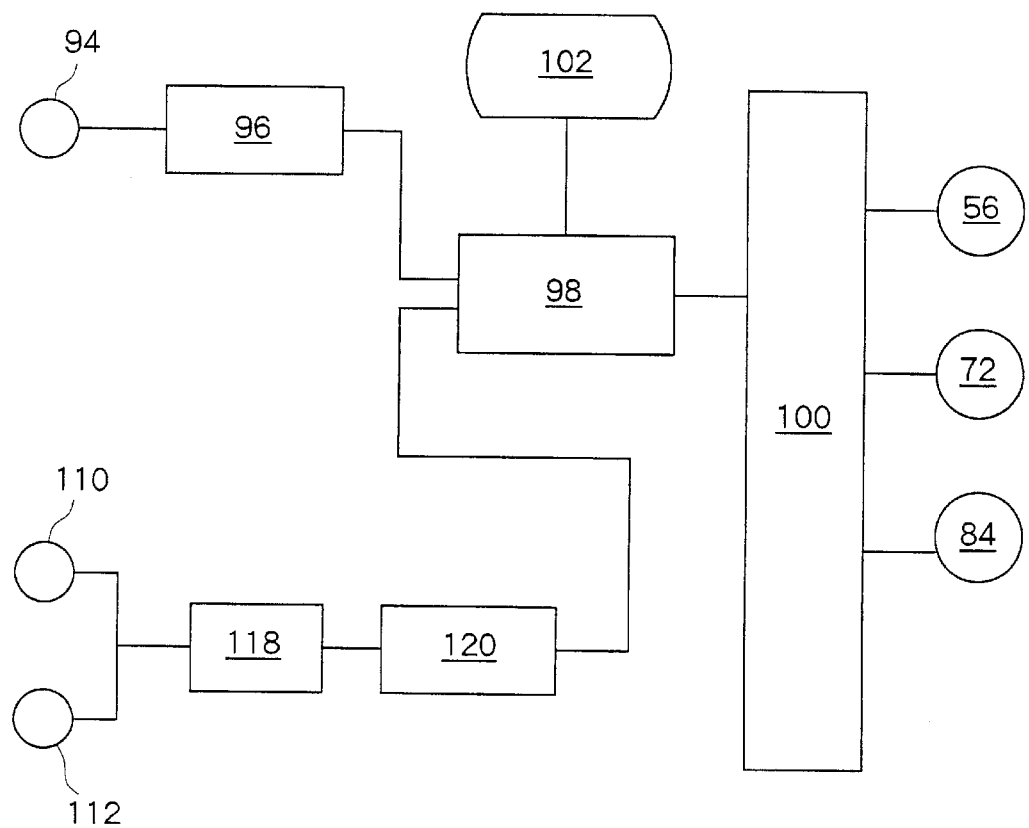
FIG. 5 is a block diagram showing optical elements and electronic elements provided in the cutting machine of FIG. 1.
Figure 6:
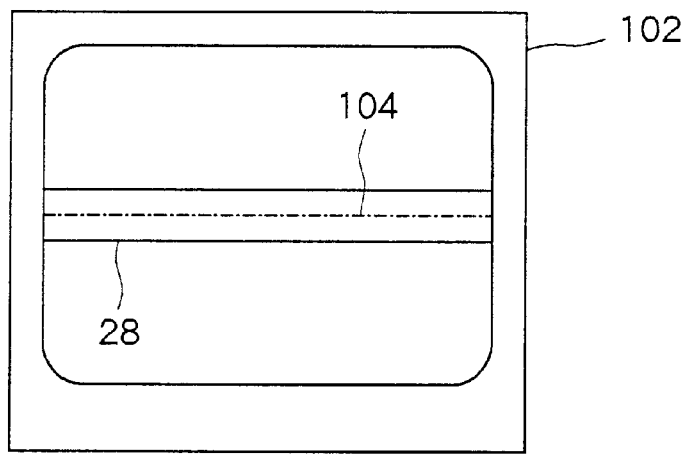
FIG. 6 is a diagram showing an example of an image obtained by the microscope of an alignment means in the cutting machine of FIG. 1.

As shown in FIG. 1 and FIG. 3, a support block 92 which projects in the X-axis direction is secured to the above casing 86. A microscope 94 that constitutes the above alignment means 42 is attached to the support block 92. When the chuck means 36 is positioned in the alignment area 10, the chuck means 36 is located below the microscope 94 and an optical image of the surface of the semiconductor wafer 20 held on the chuck means 36 is input into the microscope 94. As shown in FIG. 5, the microscope 94 is optically connected to an imaging means 96 so that the optical image input into the microscope 94 is imaged by the imaging means 96. The imaging means 96 may be advantageously constituted by a CCD. An electric signal generated by the imaging means 96 is transmitted to an image processing means 98 which makes an appropriate image processing such as binary processing on the electric signal. The processed image signal is supplied to a control means 100 and further to a monitor 102 disposed in the housing 2. FIG. 6 illustrates an example of an image of part of the surface of the semiconductor wafer 20 displayed on the monitor 102. The microscope 94 has a reference line 104 extending in the first direction, that is, in the X-axis direction. The control means 100 analyzes the supplied image signal and energizes the above pulse motor (not shown) provided in the cylindrical member 58 (FIG. 3) as required to turn the chuck plate 40 and energizes the pulse motor 72 (FIG. 3) as required to move the sliding block 66 and hence, the microscope 94 in the second direction, that is, in the Y-axis direction according to the result of analysis so that the reference line 104 of the microscope 94 should become parallel to one of the streets 28 formed on the surface of the semiconductor wafer 20 fully accurately and aligned with the center in a width direction of one of the streets 28 fully accurately.

The above constitution of the illustrated cutting machine may not be a novel and improved feature according to the present invention and may be known to people of ordinary skill in the art. Therefore, a detailed description of the constitution is omitted from the specification of the present invention.

Figure 4:
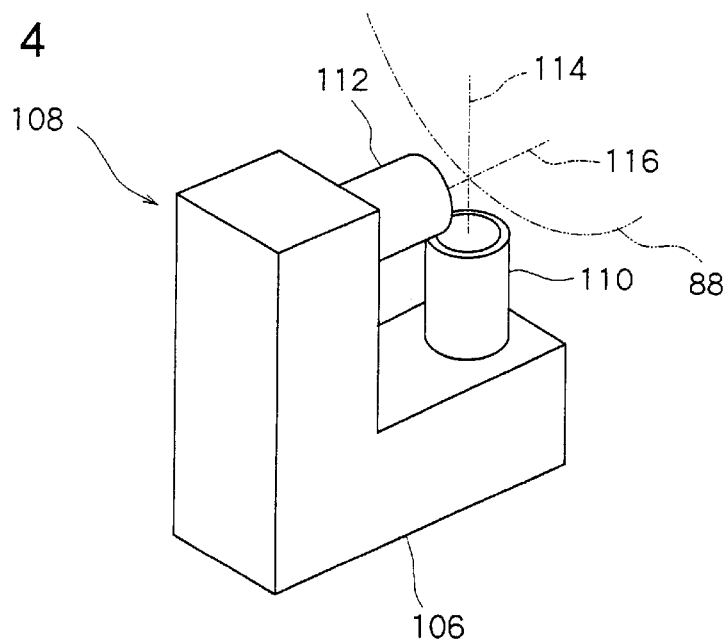
FIG. 4 is a perspective view of a first microscope and a second microscope of a rotary blade detection means provided in the cutting machine of FIG. 1.

It is important that the cutting machine constituted according to the present invention comprise the rotary blade detection means. Describing with reference to FIG. 3 and FIG. 4, an L-shaped casing 106 is secured on the support table 59 fixed to the above sliding block 52 through the cylindrical member 58. A first microscope 110 and a second microscope 112 constituting the rotary blade detection means 108 are disposed to this casing 106. It is important that the first microscope 110 have an optical axis 114 perpendicular to the second direction that is the Y-axis direction. In the illustrated embodiment, the optical axis 114 of the first microscope 110 is perpendicular to the Y-axis direction and parallel to the third direction that is the Z-axis direction. If desired, the first microscope 110 may be arranged such that the optical axis thereof is perpendicular to the Y-axis direction and parallel to the X-axis direction. It is important that the second microscope 112 have an optical axis 116 perpendicular to the third direction that is the Z-axis direction. In the illustrated embodiment, the second microscope 112 has an optical axis 116 perpendicular to the Z-axis direction and parallel to the second direction that is the Y-axis direction. If desired, the second microscope 112 may be arranged such that the optical axis 116 thereof is perpendicular to the Z-axis direction and parallel to the X-axis direction.

As shown in FIG. 5, the above first microscope 110 and the above second microscope 112 are connected to an imaging means 120 via an optical switching means 118. The switching means 118 which may comprise a known optical element connects one of the first microscope 110 and the second microscope 112 to the imaging means 120 selectively. The imaging means 120 is desirably constituted by a CCD and images an optical image input into the first microscope 110 or an optical image input into the second microscope 112. An electric signal produced by the imaging means 120 is transmitted to the above-described image processing means 98 which in turn makes appropriate image processing such as binary processing on the signal. The processed image signal is supplied to the above-described control means 100 and the above-described monitor 102. As understood with reference to FIG. 4, an optical image of the rotary blade 88 of the cutting means 44 is input into the first microscope 110 and the second microscope 112.

Figure 7:
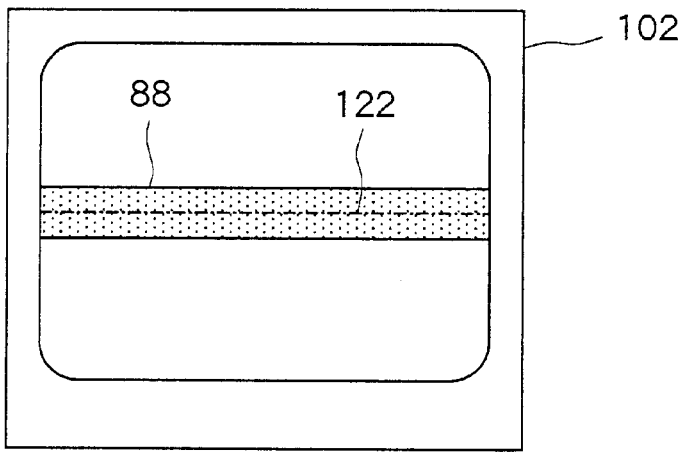
FIG. 7 is a diagram showing an example of an image obtained by a first microscope of the rotary blade detection means in the cutting machine of FIG. 1.

FIG. 7 shows an example of an image input into the first microscope 110 and displayed on the monitor 102. The first microscope 110 has a reference line 122 extending in the first direction, that is, in the X-axis direction. Preferably, this reference line 122 is aligned with the reference line 104 of the microscope 94 of the above-described alignment means 42 with respect to the position in the Y-axis direction. An optical image of the rotary blade 88 when seen from the Z-axis direction, is input into the first microscope 110 and is analyzed to detect the position of the rotary blade 88 in the Y-axis direction. In a preferred embodiment, when the rotary blade 88 is exchanged, as shown in FIG. 7, the control means 100 analyzes an image input into the first microscope 110 and appropriately energizes the pulse motor 72 (second moving means) based on the result of analysis to move the sliding block 66 in the Y-axis direction, thereby moving the rotary blade 88 in the Y-axis direction to align the center line in the thickness direction of the rotary blade 88 with the reference line 122 of the first microscope 110, that is, with the reference line 104 of the microscope 94 of the alignment means 42. This position of the rotary blade 88 is stored as a reference position in the Y-axis direction. To cut the semiconductor wafer 20 held on the chuck means 36 along the streets 28, the forward rotation and reverse rotation of the pulse motor 72 are controlled based on the above reference position in the Y-axis direction of the rotary blade 88 to index-move the rotary blade 88.

Figure 8:
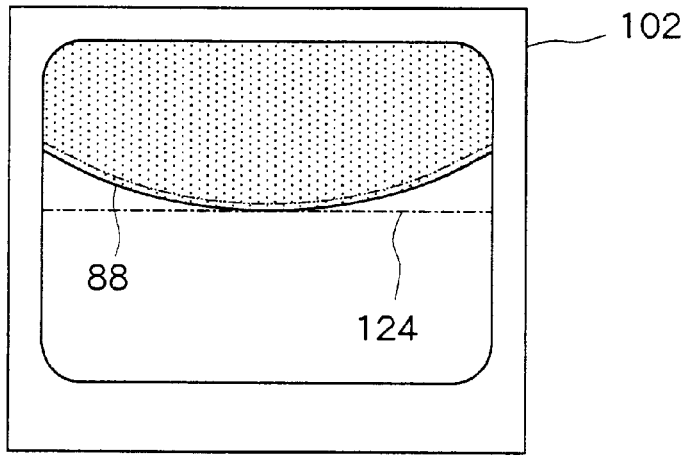
FIG. 8 is a diagram showing an example of an image obtained by a second microscope of the rotary blade detection means in the cutting machine of FIG. 1.

FIG. 8 shows an image input into the second microscope 112 and displayed on the monitor 102. The second microscope 112 also has a reference line 124 extending in the first direction, that is, in the X-axis direction. Preferably, this reference line 124 is aligned with the top surface of the chuck plate 38 of the chuck means 36 with respect to the position in the Z-axis direction. As shown in FIG. 8, an optical image of the lower end portion of the rotary blade 8 when seen from the Y-axis direction is input into the second microscope 112 and hence, an image input into the second microscope 112 is analyzed to detect the position of the circular periphery of the rotary blade 88 in the Z-axis direction. In a preferred embodiment, when the rotary blade 88 is exchanged, the control means 100 analyzes an image input into the second microscope 112 and appropriately energizes the pulse motor 84 (third moving means) based on the result of analysis to move the coupling block 82 in the Z-axis direction, thereby moving the rotary blade 88 in the Z-axis direction to align the lower end of the circular periphery of the rotary blade 88 with the reference line 124 of the second microscope 112, that is, with the top surface of the chuck plate 38. This position of the rotary blade 88 is stored as a reference position in the Z-axis direction. To cut the semiconductor wafer 20 held on the chuck means 36 along the streets 28, the forward rotation and the reverse rotation of the pulse motor 84 are controlled based on the above reference position in the Z-axis direction of the rotary blade 88 to set the cutting depth of the rotary blade 88 to a predetermined value.

The cutting mode of the semiconductor wafer 20 by the rotary blade 88 is summarized as follows. The reference line 104 of the microscope 94 of the alignment means 42 is aligned with one of the streets 28 of the semiconductor wafer 20 on the chuck means 36, and the rotary blade 88 is positioned at the reference position in the Y-axis direction (that is, the center line in the thickness direction of the rotary blade 88 is aligned with the reference line 122 of the first microscope 110 of the rotary blade detection means 108). Thus, the position in the Y-axis direction of the rotary blade 88 is aligned with one of the streets 28 of the semiconductor wafer 20. The rotary blade 88 is then positioned at a required position in the Z-axis direction, that is, in the cutting position, and the lower end of the circular periphery of the rotary blade 88 is moved up from the reference position in the Z-axis direction by the thickness of the attachment tape 22. Thereafter, the chuck means 36 is moved in a direction indicated by the arrow 60 for cutting. Thus, the semiconductor wafer 20 is cut up to the entire depth thereof along one of the streets without the attachment tape 22 being cut. Then, the rotary blade 88 is lifted upward by a distance larger than the thickness of the semiconductor wafer 20 in the Z-axis direction, and the chuck means 36 is moved in a return direction indicated by the arrow 62. Thereafter, the rotary blade 88 is index-moved in the Y-axis direction and lowered to the cutting position again. The chuck means 36 is then moved in a direction indicated by the arrow 60 for cutting, and cutting is carried out along the next street 28. After the semiconductor wafer 20 is cut along all the plurality of the streets 28 extending in a predetermined direction by carrying out the above cutting repeatedly, the chuck means 36 is turned at 90°. Similar cutting is carried out repeatedly along a plurality of streets 28 extending perpendicular to the streets 28 along which cutting has been already made.

When the above-described cutting is carried out repeatedly, the rotary blade 88 is gradually worn away. Therefore, in a case where cutting has been carried out a number of times, even when the rotary blade 88 is positioned duly at the reference position in the Z-axis direction, the lower end of the circular periphery of the rotary blade 88 is located slightly above the top surface of the chuck plate 38 of the chuck means 36 as shown exaggeratedly by a two-dot chain line in FIG. 8. Therefore, it is desired that the reference position in the Z-axis direction of the rotary blade 88 should be newly set by analyzing an image input into the second microscope 112 after cutting has been carried out a predetermined number of times. It is further desired that the predetermined amount of a change in the reference position in the Z-axis direction of the rotary blade 88 is stored each time and a warning should be issued to exchange the rotary blade 88 when it is detected that the accumulation amount of the predetermined amounts of changes exceeds a predetermined value. The accumulation amount of the predetermined amounts of changes shows the accumulation amount of abrasion of the rotary blade 88. The warning may be made by lighting out a warning lamp or sounding a warning buzzer.

In the foregoing was described in detail preferred embodiments of the cutting machine constituted according to the present invention with reference to the accompanying drawings. It should be, however, understood that the present invention is not limited thereto but can be varied or modified in a variety of other ways without departing from the spirit and scope thereof.

What is claimed is:

1. A cutting machine comprising a chuck means for holding a workpiece to be cut, a cutting means for cutting the workpiece held on the chuck means, a first moving means for moving the chuck means relative to the cutting means in a first direction, and a second moving means for moving the cutting means relative to the chuck means in a second direction perpendicular to the first direction, the cutting means being constituted by a rotary blade mounted so as to be rotated on a center axis of rotation extending in the second direction, wherein the cutting machine is provided with a rotary blade detection means capable of detecting a position of the rotary blade in the second direction.

2. The cutting machine of claim 1, wherein the cutting machine further comprises a third moving means for moving the cutting means relative to the chuck means in the third direction perpendicular to the first direction and the second direction, the rotary blade is shaped like an annular thin plate perpendicular to the second direction, the cutting depth of the workpiece is defined by a position of a circular periphery of the rotary blade in the third direction, cutting is carried out by moving the chuck means relative to the cutting means in the first direction, and the rotary blade detection means can also detect the position of the circular periphery of the rotary blade in the third direction.

3. The cutting machine of claim 1, wherein the rotary blade detection means has a first microscope having an optical axis perpendicular to the second direction, an imaging means for imaging an optical image input into the first microscope and an image processing means for processing an image obtained by the imaging means.

4. The cutting machine of claim 2, wherein the rotary blade detection means comprises a first microscope having an optical axis perpendicular to the second direction, a second microscope having an optical axis perpendicular to the third direction, an imaging means for imaging an optical image input into the first microscope and an optical image input into the second microscope selectively, and an image processing means for processing an image obtained by the imaging means.

5. The cutting machine of claim 4, wherein the optical axis of the second microscope is parallel to the second direction.

6. The cutting machine of claim 1, wherein the workpiece is a semiconductor wafer which has a plurality of rectangular regions sectioned by streets formed on a surface in a lattice form and semiconductor circuits formed in respective rectangular regions, and is cut along the streets.

\* \* \* \* \*